US008340238B2

(12) United States Patent
Scholz et al.

(10) Patent No.: US 8,340,238 B2
(45) Date of Patent: Dec. 25, 2012

(54) RECEIVING DEVICE FOR RECEIVING TIME-MULTIPLEXED SIGNALS, TRANSMITTING SYSTEM, AND METHOD FOR TIME SYNCHRONIZATION OF TIME-MULTIPLEXED SIGNALS

(75) Inventors: Maik Scholz, Feldbergen (DE); Arnd Wendland, Nordstemmen (DE)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 11/661,639

(22) PCT Filed: Jul. 13, 2005

(86) PCT No.: PCT/EP2005/053359
§ 371 (c)(1),
(2), (4) Date: Sep. 14, 2007

(87) PCT Pub. No.: WO2006/024575
PCT Pub. Date: Mar. 9, 2006

(65) Prior Publication Data

US 2008/0049882 A1 Feb. 28, 2008

(30) Foreign Application Priority Data

Sep. 2, 2004 (DE) ......................... 10 2004 042 376

(51) Int. Cl.
*H04L 7/02* (2006.01)

(52) U.S. Cl. ........................................................ 375/360

(58) Field of Classification Search ........................ None
See application file for complete search history.

(56) References Cited

U.S. PATENT DOCUMENTS

2002/0080895 A1* 6/2002 Lindberg ...................... 375/316

FOREIGN PATENT DOCUMENTS

| | | | |
|---|---|---|---|
| DE | 19615843 | * | 4/1996 |
| DE | 196 15 843 | | 10/1997 |
| EP | 0 656 702 | | 6/1995 |
| EP | 0944194 | * | 9/1999 |
| EP | 1 113 599 | | 7/2001 |

* cited by examiner

*Primary Examiner* — Chi Pham
*Assistant Examiner* — Kouroush Mohebbi
(74) *Attorney, Agent, or Firm* — Kenyon & Kenyon LLP

(57) ABSTRACT

In a receiving device for receiving a time-multiplexed signal on one carrier frequency and for reading out a content datum of a further time-multiplexed signal on a further carrier frequency, a receiving unit and a context changing unit are provided in order to change, for the duration of a data symbol in the frame of the time-multiplexed signal of the carrier frequency, to reception of the further time-multiplexed signal on the further carrier frequency, in order to receive a data symbol of the further time-multiplexed signal.

2 Claims, 2 Drawing Sheets

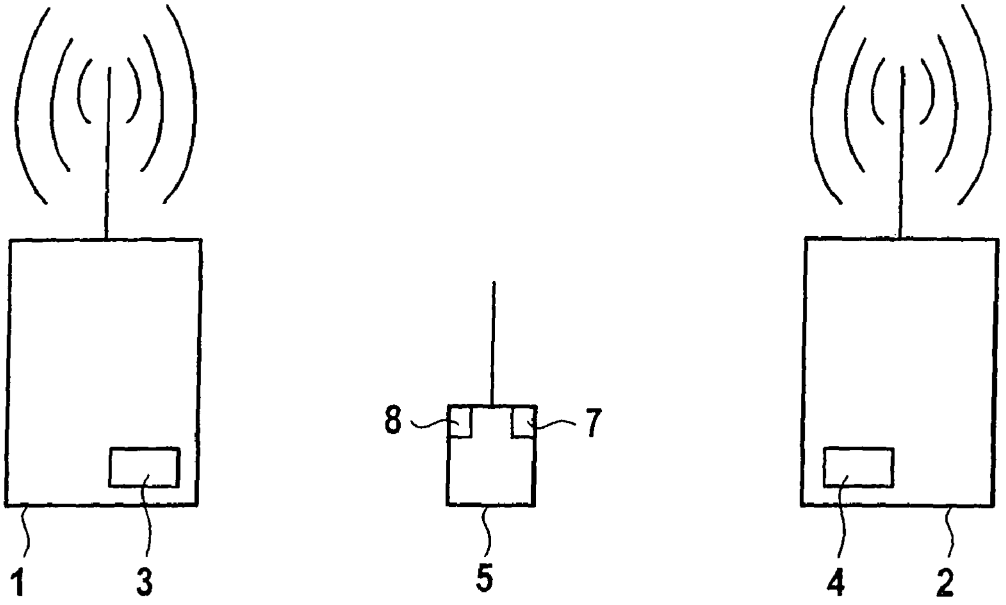
Fig. 1
Fig. 3
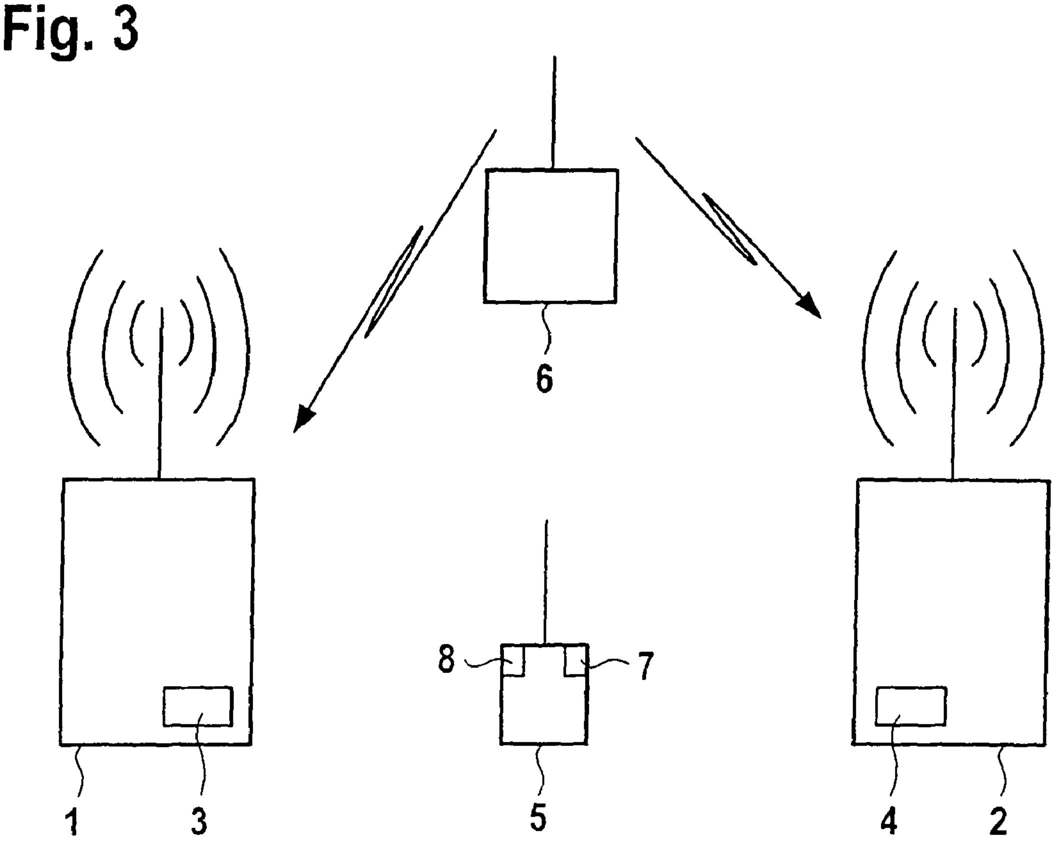

RECEIVING DEVICE FOR RECEIVING TIME-MULTIPLEXED SIGNALS, TRANSMITTING SYSTEM, AND METHOD FOR TIME SYNCHRONIZATION OF TIME-MULTIPLEXED SIGNALS

BACKGROUND OF THE INVENTION

1. Field of the Invention

The present invention relates to a receiving device for receiving time-multiplexed signals on one or more carrier frequencies, a transmitting system having multiple transmitting devices in order to cover a larger receiving region, and a method for operating a transmitting device.

2. Background Information

The European terrestrial digital audio system (DAB=digital audio broadcasting), which in the long term is intended to replace present-day FM/RDS radio, allows not only the transmission of audio programs, but also the transmission of additional digital data (PAD=program-associated data) at relatively high data rates.

In an OFDM signal used for this purpose, these additional data are coded in time-multiplexed fashion in the form of data symbols that are located at a defined time-related position within a frame. In an OFDM signal, such frames are transmitted successively in time and usually contain synchronization symbols, data symbols, and useful symbols. The structure of the frames is usually defined in the context of DAB.

Upon reception of a digital radio program, an OFDM signal is usually received and is demodulated and decoded in known fashion. The additional datum contained therein in accordance with the data symbol is available to a user. It is also desirable, however, for additional data from OFDM signals on other carrier frequencies to be made available to a user. This can be done by briefly switching the OFDM receiver to another carrier frequency, receiving the OFDM signal thereon, and demodulating and decoding the data symbol. This time period during which switchover to the other carrier frequency occurs should, however, be as short as possible, and the point in time should be selected so that at the time of the switchover, no useful symbol that is required for the radio program currently being listened to is being transmitted on the original carrier frequency. Because the point in time of the data symbol of the OFDM signal on the other carrier frequency is not known, however, in order to locate the data symbol it is necessary to switch over to the other carrier frequency for an unacceptably long time period to detect the data symbol. It may happen in this context that one or more useful symbols that are necessary for decoding the radio program are lost, and the user notices an interruption in the radio program.

It is therefore an object of the present invention to make available a receiving device, a method for operating a transmitting device, and a transmitting system, such that additional data can also be received from other time-multiplexed signals on other carrier frequencies without losing from the useful data stream any useful data that are necessary for decoding.

BRIEF SUMMARY OF THE INVENTION

According to the present invention, a transmitting system is provided having one or more transmitting devices for transmitting time-multiplexed signals on one or more carrier frequencies. The time-multiplexed signals are each coded in successive time-related frames which contain, each at a defined position in time, a data symbol and a useful symbol.

The transmitting devices each have a synchronization device in order to receive an external synchronization signal with which the position in time of the frames of the time-multiplexed signal is set so that the data symbol is transmitted at the defined point in time. The synchronization device (3, 4) of a transmitting device (1, 2) furthermore receives, as an external synchronization signal, a time-multiplexed signal transmitted by a further one of the transmitting devices (1, 2), the frames of the time-multiplexed signal transmitted by the transmitting device (1, 2) being in phase with the time-multiplexed signal transmitted by the further transmitting device (1, 2) so that the data symbol is transmitted at defined points in time.

The transmitting device has the advantage that it can synchronize the emitted signal so that it emits, synchronously with other transmitting devices, the time-multiplexed signal that is to be transmitted. For that purpose, the transmitting device receives as an external synchronization signal a further receivable time-multiplexed signal or a synchronization signal generated by a further transmitting device. It is possible in this fashion to furnish a transmitting system having multiple transmitting devices, each of the transmitting devices emitting a time-multiplexed signal that is time-synchronized, so that the frames of the emitted time-multiplexed signals begin at the same point in time.

Alternatively, the synchronization devices of the transmitting devices can be interconnected in order to mutually interchange the external synchronization signal. This makes it possible to dispense with the provision of an additional synchronization unit, since the transmitting devices mutually synchronize themselves.

According to the present invention, a receiving device is also provided for receiving a time-multiplexed signal and for reading out a content datum from a further time-multiplexed signal on another carrier frequency. The receiving device has a context changing unit in order to change, for the duration of the data symbol in the frame of the time-multiplexed signal of the carrier frequency, to reception of the further time-multiplexed signal on the other carrier frequency, and receive the data symbol thereon.

The receiving device in accordance with the present invention has the advantage that it can easily carry out a context change at a defined point in time, i.e., switches over to receiving a time-multiplexed signal on a further carrier frequency for the duration of the data symbol on the carrier frequency, in order to receive and evaluate the data symbol, present there, of the further time-multiplexed signal. This is possible if the various time-multiplexed signals are synchronized with one another, so that the data symbols of the various signals are superimposed on one another in time.

In this manner, the provision of a complex device for locating the data symbol of the further time-multiplexed signal may be avoided, without greatly disturbing reception of the useful data.

According to the present invention, a method for operating a transmitting device is provided, in which method a time-multiplexed signal is received from an adjacent transmitting device, the location in time of the frame of the time-multiplexed signal transmitted by the adjacent OFDM transmitting device is determined, and a time-multiplexed signal is generated whose frame is synchronous in time with the frame of the received time-multiplexed signal.

Alternatively, the transmitting device according to the present invention can be operated by the fact that an external synchronization signal is received either from a synchronization unit or from a further transmitting device, and an OFDM signal is generated, the location in time of the frame being dependent on the external synchronization signal.

BRIEF DESCRIPTION OF THE SEVERAL VIEWS OF THE DRAWING

FIG. 1 shows a transmitting system having transmitting devices and a receiving device, according to an example embodiment of the present invention.

FIG. 3 shows a transmitting system having transmitting devices, a receiving device, and a synchronization unit, according to a further example embodiment of the invention.

DETAILED DESCRIPTION OF THE INVENTION

Figure 2A:
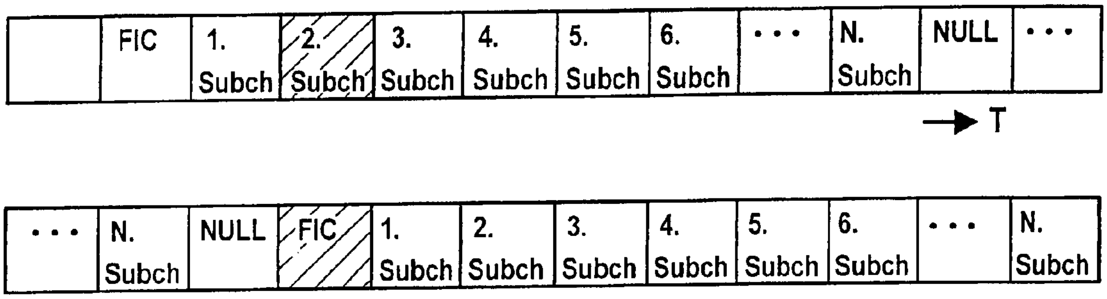
FIG. 2*a* shows the time-related constellation of OFDM signals transmitted by different transmitting devices, according to the existing art.

FIG. 1 depicts a transmitting system according to a first example embodiment of the invention. The transmitting system encompasses a first OFDM transmitting device 1 and a second OFDM transmitting device 2, each of which can emit OFDM radio signals on one or more carrier frequencies. Located in the receiving region of first and second OFDM transmitting devices 1, 2 is an OFDM receiver 5 that can receive an OFDM signal on various carrier frequencies.

Each of the OFDM transmitting devices 1, 2 has a synchronization unit 3, 4. First and second synchronization devices 3, 4 serve to synchronize with one another the OFDM signals emitted by the first and the second OFDM transmitting device 1, 2.

An OFDM signal transmitted by transmitting devices 1, 2 possesses successively transmitted time-related frames that may (e.g., in DAB mode 4) have a time length of 48 ms. Another time length can, however, also be defined for such a frame. A frame encompasses OFDM symbols that are variously coded. Each frame begins with a synchronization symbol, the so-called null symbol NULL, for coarse synchronization of the frame; this is followed by a data symbol FIC that contains additional data such as, for example, a transmitter identification list, the various program sources available within the frame, traffic information, or other data. The data symbol is followed by multiple subchannel symbols Subch, each of which is associated with a specific program source. A frame of this kind is evident, for example, from FIG. 2*a*.

Upon a context change, an OFDM receiving unit 5 is switched over, with the aid of a context changing unit 7, in such a way that it can receive an OFDM signal on another carrier frequency. The purpose of this is to receive and evaluate the data symbol of the OFDM signal on the other carrier frequency, in order to obtain the data coded therein. This switchover by OFDM receiving device 5 can be carried out, however, only outside a time window during which the useful symbol containing the useful data for reception of the selected program source are being carried out. If, as shown in the frames of two OFDM signals depicted one above another in FIG. 2, the useful symbol associated with the selected program source is located in time above the data symbol of a further OFDM signal on a further carrier frequency, the change to reception of the further OFDM signal cannot be carried out without audible disruption, since the useful symbol of the OFDM signals cannot be received simultaneously with the data symbol of the further OFDM signal.

Synchronization devices 3, 4 are configured so that they synchronize with one another the OFDM signals emitted by first and second transmitting devices 1, 2, so that the frames of the emitted OFDM signals are synchronous with one another.

Figure 2B:
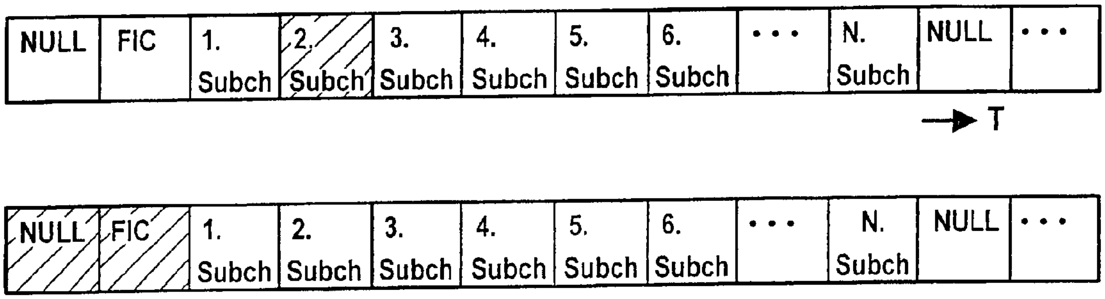
FIG. 2*b* shows the time-related constellation of OFDM signals transmitted by two OFDM transmitting devices, in accordance with the example method of the present invention.

A constellation of this kind is depicted in FIG. 2*b* in the frames of two different contexts of two different OFDM signals. It is evident that the null symbol NULL, data symbols FIC, and subchannel symbols Subch, i.e., the useful symbols, are located synchronously with one another, so that the useful symbol of the OFDM signal that contains the selected program source, e.g., from the first OFDM transmitting device, can be received, and it is possible to switch over, outside the useful symbol, to the second context, i.e., to the OFDM signal being transmitted by the second OFDM transmitting device, in order to receive the data symbol transmitted there. OFDM receiving device 5 thus switches over, while the data symbol is receivable on the carrier frequency, to the further carrier frequency of the further OFDM signal, since with synchronous transmission the data symbol of the further OFDM signal can be received there. Selection of the further carrier frequency for the further OFDM signal is accomplished with the aid of a selection unit 8 that sets the further carrier frequency on the basis of a parameter, a user input, or a search function that defines a series of further carrier frequencies.

In the example embodiment according to FIG. 1, synchronization is accomplished in that the first transmitting device receives the OFDM signal transmitted from the second transmitting device and determines the beginning of the frame, in order to synchronize therewith the OFDM signal transmitted from the first transmitting device. Synchronization device 4 of the second OFDM transmitting device operates in similar fashion: it receives the OFDM signal of the first OFDM transmitting device 1 and synchronizes the transmitted second OFDM signal therewith.

FIG. 3 depicts a transmitting system according to a further example embodiment of the invention. The embodiment of FIG. 3 differs from the embodiment of FIG. 1 in that the OFDM transmitting devices do not synchronize with one another but rather are connected to an external synchronization unit 6 that generates a synchronization signal, the frames of the OFDM signals being synchronized as a function of the synchronization signal. Synchronization unit 6 can be connected to OFDM transmitting devices 1, 2 via a line connection or a wireless connection. A synchronization unit of this kind can be made available, for example, by a GPS satellite system that emits very precisely timed signals.

The receiving device is, for example, set to the carrier frequency of the first OFDM signal and, as depicted in FIG. 2*b*, decodes the second subchannel. In parallel with normal operation, e.g., an audio output, the receiver can switch over, during the null symbol and the data symbol, to another carrier frequency and decode the data symbol there. A more accurate identification of the corresponding context can thereby be performed. Reception of the null symbol and data symbol of the OFDM signal of the first transmitting device can be dispensed with from time to time, since these data are generally redundant.

What is claimed is:

1. A system for transmitting and receiving time-multiplexed signals, comprising:

- a transmitting arrangement including at least first and second OFDM transmitting devices which can each emit OFDM radio signals on at least one carrier frequency; wherein:
  - the OFDM transmitting devices each includes a synchronization unit, each of which serve to synchronize with one another the frames of the OFDM signals emitted by the OFDM transmitting devices; and
  - the OFDM signals transmitted by the OFDM transmitting devices possesses successively transmitted time-related frames having OFDM symbols that are variously coded, wherein each frame begins with a synchronization null symbol for coarse synchronization of the frame, a data symbol that contains additional data, including a transmitter identification list, and multiple subchannel symbols each of which is associated with a specific program source;

an OFDM receiving unit located in a receiving region of the first OFDM transmitting device and the second OFDM transmitting device and capable of receiving the OFDM signals on each of the at least one carrier frequencies; and a context changing unit operatively coupled to the OFDM receiving unit for switching, for the duration of a data symbol in a frame of the first time-multiplexed signal on the first carrier frequency, to reception of the second time-multiplexed signal on the second carrier frequency, so that the OFDM receiving unit can receive an OFDM signal on another carrier frequency, so as to receive and evaluate the data symbol of the OFDM signal on the other carrier frequency to obtain the data coded therein, wherein this switchover by the OFDM receiving device is performed only outside a time window during which the useful symbol containing the useful data for reception of the selected program source are being performed.

2. The receiving device as recited in claim 1, further comprising:

a selection unit for defining the second carrier frequency of the second time-multiplexed signal on the basis of one of a user input and a search function.

* * * * *